United States Patent
Yeh et al.

(10) Patent No.: US 9,008,805 B2
(45) Date of Patent: *Apr. 14, 2015

(54) PROGRAMMABLE LOGIC CONTROLLER

(75) Inventors: Chi-Hsien Yeh, New Taipei (TW); Zhong Qin, Shenzhen (CN); Yang Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 676 days.

This patent is subject to a terminal disclaimer.

(21) Appl. No.: 13/210,558

(22) Filed: Aug. 16, 2011

(65) Prior Publication Data

US 2012/0158156 A1 Jun. 21, 2012

(30) Foreign Application Priority Data

Dec. 21, 2010 (CN) .......................... 2010 1 0598588

(51) Int. Cl.
*G05B 19/05* (2006.01)
(52) U.S. Cl.
CPC ..................................... *G05B 19/05* (2013.01)
(58) Field of Classification Search
None
See application file for complete search history.

(56) References Cited

U.S. PATENT DOCUMENTS

| 7,299,099 B1* | 11/2007 | Divelbiss et al. ............... 700/18 |
| 8,648,620 B2* | 2/2014 | Yeh et al. ......................... 326/38 |
| 2007/0142938 A1* | 6/2007 | Huang ............................ 700/40 |
| 2007/0173960 A1* | 7/2007 | Kumar ............................ 700/40 |

FOREIGN PATENT DOCUMENTS

| CN | 2427772 Y | 4/2001 |
| CN | 1987699 A | 6/2007 |
| TW | 434472 | 5/2001 |

* cited by examiner

*Primary Examiner* — Sean Shechtman
*Assistant Examiner* — Steven Garland
(74) *Attorney, Agent, or Firm* — Novak Druce Connolly Bove + Quigg LLP

(57) ABSTRACT

A PLC includes a single-chip, a DC power module, a relay output module, an I/O module, and a pulse output module. The single chip includes a single-chip timer, a hardware watchdog, a 11.0592M crystal, and an A/D converter module. A system program is burned into an EEPROM (Electrically Erasable Programmable Read-Only Memory) of the single-chip. The system program includes a programming module and a control module. A DC power module includes an anti jamming circuit, a first output port, and a second output port. The first output port and the second output port are respectively connected to the anti-jamming circuit, and the single-chip is connected to the first output port. A relay output module is connected to the second output port. An I/O module receives and sends digital signals.

11 Claims, 6 Drawing Sheets

US 9,008,805 B2

PROGRAMMABLE LOGIC CONTROLLER

CROSS-REFERENCE TO RELATED APPLICATIONS

This application is related to a U.S. patent application Ser. No. 13/210,560, issued as U.S. Pat. No. 8,648,620, and entitled "PROGRAMMABLE LOGIC CONTROLLER," by Yeh et al. Such application has the same assignee as the present application. The disclosure of the above identified application is incorporated herein by reference.

BACKGROUND

1. Technical Field

The present disclosure relates to programmable logic controllers (PLCs).

2. Description of the Related Art

PLCs are widely used in the field of automatic control. The PLC is flexible and convenient for controlling machines, and has been developed for several years. However, PLCs on the market with high reliability and stability are expensive. Using expensive PLCs to control the machines to do simple actions, such as horizontal movement, would increase manufacturing product costs.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
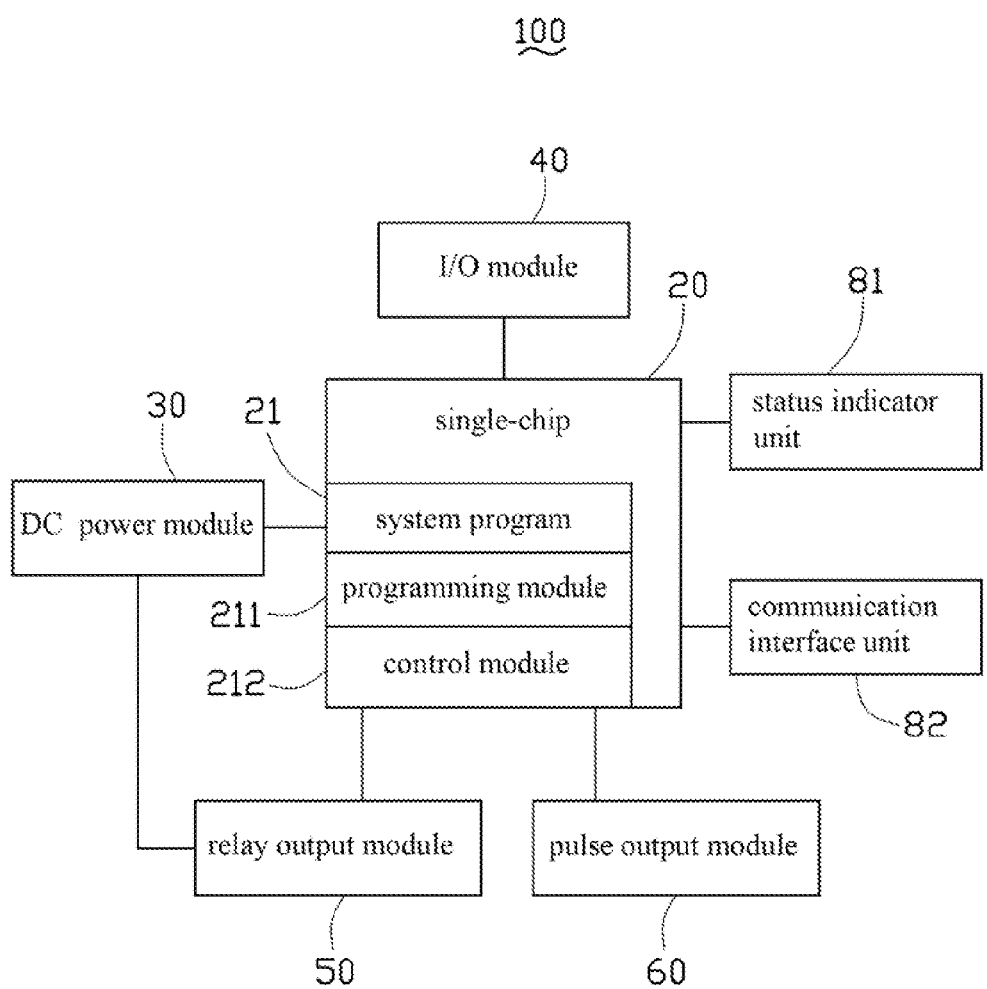
FIG. 1 is a functional block diagram of one embodiment of a PLC including a single-chip, a power module, an I/O module, a relay output module, and pulse output module.
Figure 2:
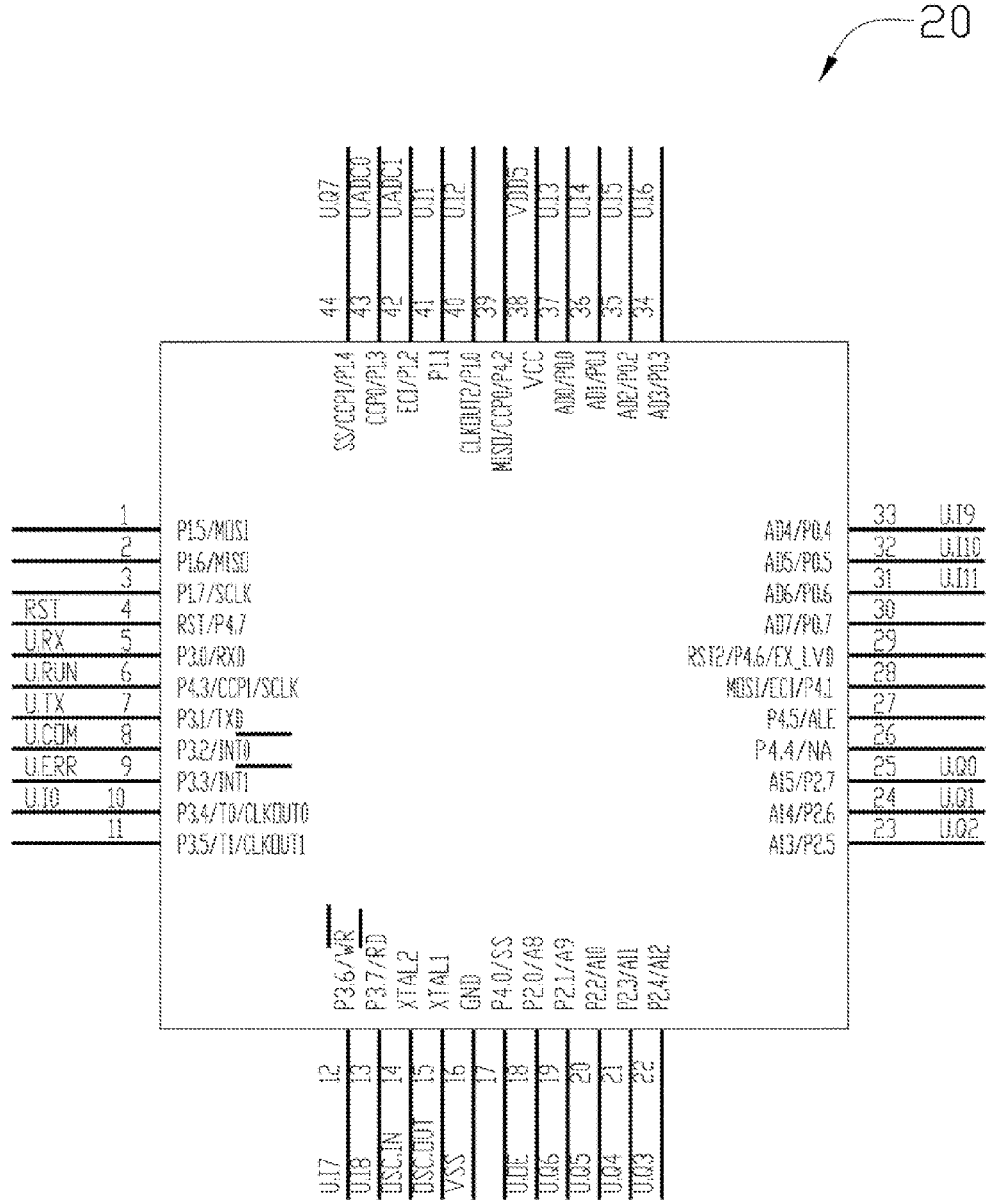
FIG. 2 is a circuit diagram of the PLC of FIG. 1.
Figure 3:
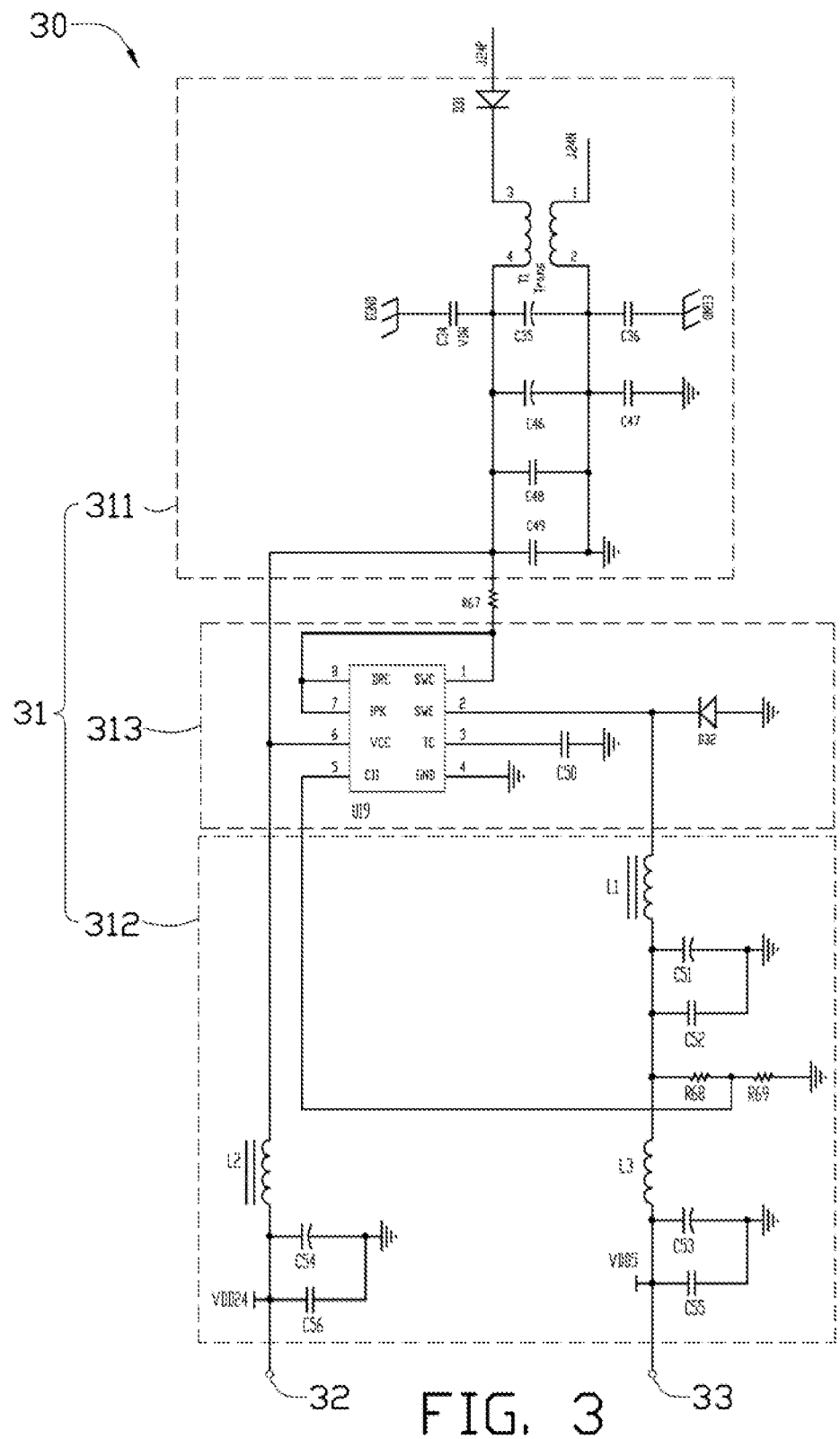
FIG. 3 is a circuit diagram of the power module of FIG. 1.
Figure 4:
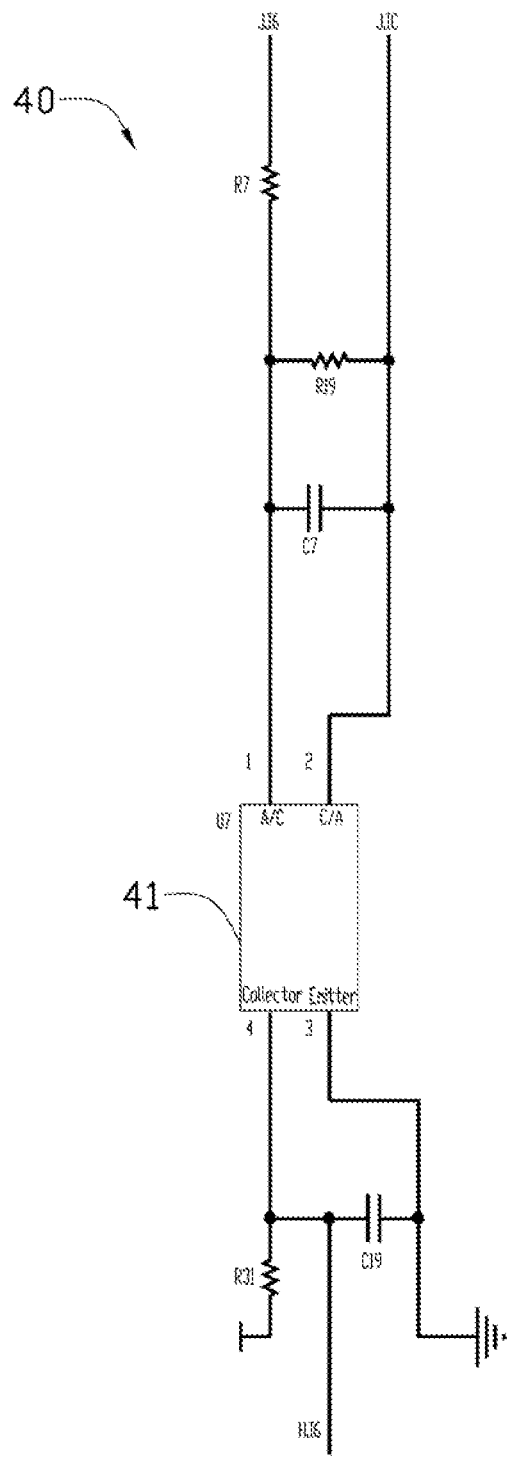
FIG. 4 is a circuit diagram of the I/O module of FIG. 1.
Figure 5:
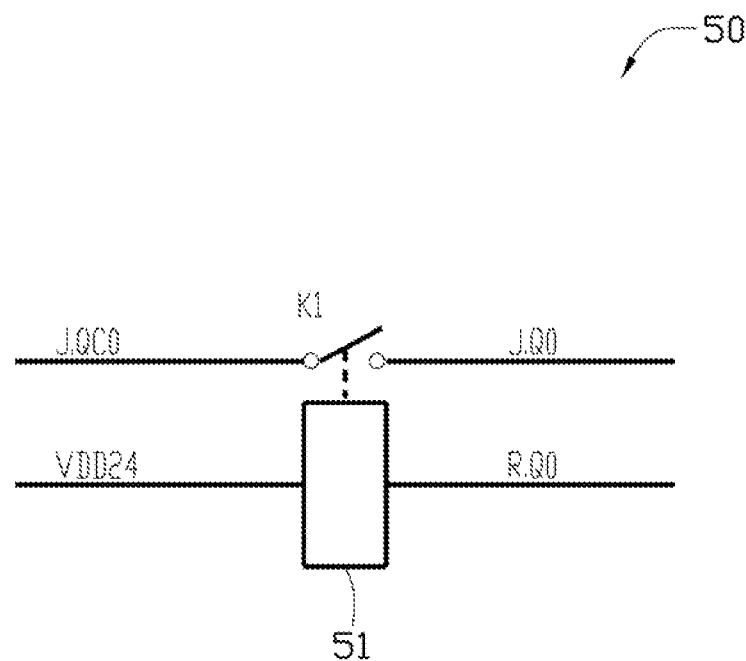
FIG. 5 is a circuit diagram of the relay output module of FIG. 1.
Figure 6:
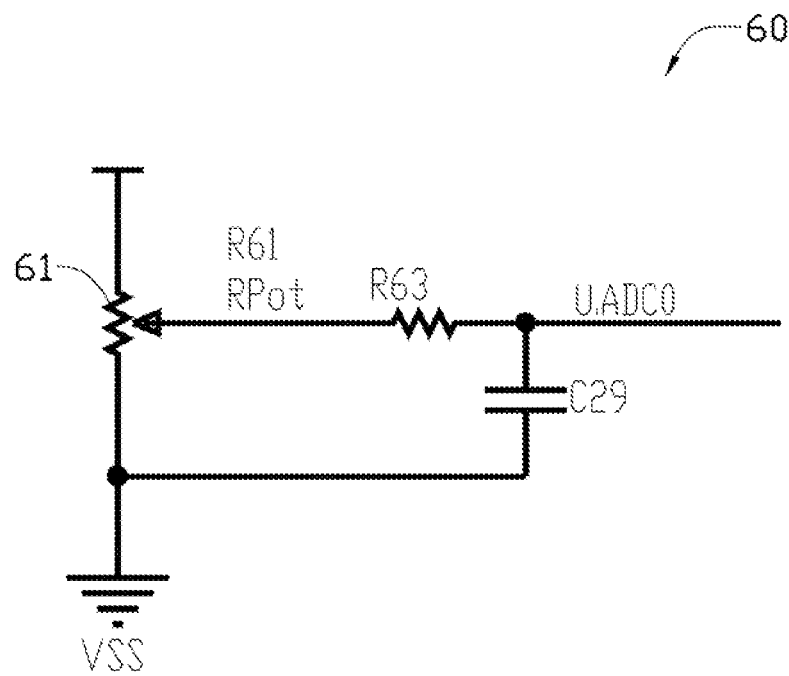
FIG. 6 is a circuit diagram of the pulse output module of FIG. 1.

Referring to FIG. 1, an embodiment of a PLC 100 employs a single-chip 20 as a core, a DC (Direct Current) power module 30, an I/O module 40, a relay output module 50, and a pulse output module 60. In one embodiment, the single-chip 20 is an Intel® MCS-51 series SOC (System On Chip).

A system program 21 can be burned into an EEPROM (Electrically Erasable Programmable Read-Only Memory) of the single-chip 20. The system program 21 scans input signals from the I/O module 40 during a predetermined period, and generates output signals to control output of the relay output module 50 and the pulse output module 60.

The Intel MCS-51® series SOC single-chip 20 can integrate a single-chip timer, a hardware watchdog, a 11.0592M crystal, and an A/D converter module. The Intel MCS-51® series SOC single-chip 20 has low cost and can be used easily. Therefore, the PLC 100 using the Intel MCS-51® series SOC single-chip 20 also has a relatively low hardware cost. In the illustrated embodiment, the Intel MCS-51® series SOC single-chip 20 uses 8-bit single machine cycle instruction.

The system program 21 includes a programming module 211 and a control module 212. The programming module 211 receives user programming data and generates corresponding control commands. The programming module 211 includes a main function to compile links, and a function subroutine library to execute the control commands. The function subroutine library includes a plurality of subroutines to achieve different functions, such as shifting and comparing. The main function calls the subroutines of the function subroutine library, to realize simple and convenient programming. The system program 21 can also run the user self-programming KeilC/ program. The programming module 211 employs a method that the main function calls the subroutines, so users can easily compile a control program. Thus, the PLC 100 is easily operated.

The control module 212 scans the input signals from the I/O module 40 during predetermined periods, processes the input signals according to the control commands generated by the programming module 211, and then generates output signals to control output data of the relay output module 50 and the pulse output module 60.

Referring to FIGS. 2 through 6, the DC power module 30 provides a stable voltage source, and includes an anti-jamming circuit 31, a first output port 32, and a second output port 33. The first output port 32 and the second output port 33 are respectively connected to the anti jamming circuit 31. A 24V DC switching power is connected to an input port of the DC power module 30. The first output port 32 outputs 5V DC power to the Intel MCS-51® series SOC single-chip 20. The second output port 33 output 24V DC to the relay output module 50.

In order to enhance stability of the DC power module 30 and reduce output voltage noise, the anti jamming circuit 31 includes a first filter circuit 311, a second filter circuit 312, and an isolated DC converter module 313 interconnected between the first filter circuit 311 and the second filter circuit 312. In the illustrated embodiment, the first filter circuit 311 and the second filter circuit 312 are multi-level filter circuits, and the isolated DC converter module 313 can be a TI MC34063A® chip, a 1.5-A Boost/Buck/Inverting Switching Regulator. The first output port 32 and the second output port 33 are connected to the second filter circuit 312. The DC power module 30 outputs little current noise, and helps to improve the stability and reliability of the PLC 100.

The I/O module 40 receives/sends digital signals. An optical coupling device is coupled between an input port of the I/O module 40 and an output port of the I/O module 40. In the illustrated embodiment, the optical coupling device 41 may choose Toshiba TLP280-1® type. The I/O module 40 has twelve input/output including high-speed pulse/count inputs, and analog input/analog-digital conversion interfaces, for example.

The relay output module 50 includes a relay 51 for controlling the action of a machine (not shown). The relay 51 is connected to the second output port 33 of the DC power module 30. In the illustrated embodiment, the relay output module 50 has eight outputs.

The pulse output module 60 includes an adjustable resistor 61. The output pulse amplitude can be adjusted by adjusting the resistance value of adjustable resistor 61. The pulse output module 60 drives a stepper motor or a servo motor (not shown) to work. In the illustrated embodiment, the pulse output module 60 has two outputs.

In addition, the PLC 100 can further include a status indicator unit 81 and a communication interface unit 82. The status indicator unit 81 is connected to the input/output ports of the Intel MCS-51® series SOC single-chip 20, and has a plurality of LEDs (light-emitting diodes) (not shown). If the status of the input/output ports of the Intel MCS-51® series SOC single-chip 20 changes, the LEDs turn on/off for indicating the status of the input/output ports.

The communication interface unit 82 can be programmed online, and communicate with a host computer or touch screen through a configuration of the communication routines and a vector map. It should be pointed out that, the I/O ports can be extended by the communication interface unit 82.

The PLC 100 employs the Intel MCS-51® series SOC single-chip 20 as the core, therefore, the PLC 100 has a low hardware cost, and is easily used. Furthermore, the single-chip 20 and the relay output module 50 share the DC power module, thereby simplifying the circuit structure of the PLC 100.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A programmable logic controller (PLC), comprising:
a single-chip comprising a single-chip timer, a hardware watchdog, a 11.0592M crystal, and an A/D converter module, and having an EEPROM and a system program burned into the EEPROM;
a DC power module comprising an anti jamming circuit, a first output port, and a second output port, the first output port and the second output port being respectively connected to the anti jamming circuit, the single-chip being connected to the first output port;
a relay output module connected to the second output port;
an I/O module for receiving and sending digital signals; and
a pulse output module;
wherein the system program comprises a programming module and a control module, the programming module comprises a main function, and a function subroutine library, the main function calls the subroutines of the function subroutine library to execute control commands generated by user programming data, the control module scans input signals from the I/O module during predetermined periods, and then generates output signals to control output of the relay output module and the pulse output module.

2. The PLC of claim 1, wherein the anti-jamming circuit comprises a first filter circuit, a second filter circuit, and an isolated DC converter module interconnected between the first filter circuit and the second filter circuit.

3. The PLC of claim 2, wherein the first filter circuit and the second filter circuit are multi-level filter circuits.

4. The PLC of claim 2, wherein the isolated DC converter module is a 1.5-A Boost/Buck/Inverting Switching Regulator chip.

5. The PLC of claim 1, wherein the pulse output module comprises an adjustable resistor for adjusting output pulse amplitude.

6. The PLC of claim 1, further comprising a communication interface unit connected to the single-chip.

7. The PLC of claim 6, wherein the communication interface unit programs online, and communicates with a host computer or touch screen through a configuration of communication routines and a vector map.

8. The PLC of claim 1, further comprising a status indicator unit connected to the single-chip.

9. The PLC of claim 1, wherein the I/O module comprises an optical coupling device coupled between an input port of the I/O module and an output port of the I/O module.

10. The PLC of claim 1, wherein the I/O module comprises high-speed pulse/count inputs and analog input/analog-digital conversion interfaces.

11. The PLC of claim 1, wherein the single-chip uses 8-bit single machine cycle instruction.

* * * * *